US011550882B2

(12) United States Patent
Hensgen et al.

(10) Patent No.: US 11,550,882 B2
(45) Date of Patent: *Jan. 10, 2023

(54) SECURE DRM-AGNOSTIC KEY ROTATION

(71) Applicant: OpenTV, Inc., San Francisco, CA (US)

(72) Inventors: Debra Hensgen, San Jose, CA (US); Charles Stevens, Mountain View, CA (US)

(73) Assignee: OPENTV, INC., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/302,523

(22) Filed: May 5, 2021

(65) Prior Publication Data
US 2021/0256098 A1 Aug. 19, 2021

Related U.S. Application Data

(63) Continuation of application No. 16/553,926, filed on Aug. 28, 2019, now Pat. No. 11,030,279, which is a
(Continued)

(51) Int. Cl.
*H04L 9/08* (2006.01)
*G06F 21/10* (2013.01)
(Continued)

(52) U.S. Cl.
CPC ............ *G06F 21/105* (2013.01); *G06F 21/10* (2013.01); *G06F 21/602* (2013.01);
(Continued)

(58) Field of Classification Search
CPC ...... G06F 21/105; G06F 21/10; G06F 21/602; G06F 21/6209; G06F 2221/0753;
(Continued)

(56) References Cited

U.S. PATENT DOCUMENTS 6,782,103 B1 * 8/2004 Arthan .................. H04L 9/0891
380/278
7,266,198 B2 9/2007 Medvinsky
(Continued)

FOREIGN PATENT DOCUMENTS

CN 109997135 A 7/2019
EP 1798976 A2 6/2007
(Continued)

OTHER PUBLICATIONS

U.S. Appl. No. 15/361,904 U.S. Pat. No. 10,437,968, filed Nov. 28, 2016, Secure DRM-Agonistic Key Rotation.
(Continued)

*Primary Examiner* — Amie C. Lin
(74) *Attorney, Agent, or Firm* — Schwegman Lundberg & Woessner, P.A.

(57) ABSTRACT

Systems and methods for managing provisioning of keys prior to a key rotation are provided. A license server generates a license that is associated with a renewal time. The renewal time is a time that is prior to a key rotation time, and triggers a receiver device to send a renewal request prior to the key rotation time. The renewal time may be a randomized time prior to the key rotation time that differs for different receiver devices. The license is transmitted to the receiver device. The license server then receives a renewal request from the receiver device that is triggered at the renewal time. The license server generates a next license that comprises a next key, whereby the next key is a decryption key for decrypting the encrypted signal after the key rotation time. The next license is transmitted to the receiver device prior to the key rotation time.

17 Claims, 7 Drawing Sheets

Related U.S. Application Data continuation of application No. 15/361,904, filed on Nov. 28, 2016, now Pat. No. 10,437,968.

(51) Int. Cl.
| | |
|---|---|
| *H04N 21/262* | (2011.01) |
| *H04N 21/266* | (2011.01) |
| *H04N 21/8355* | (2011.01) |
| *G06F 21/60* | (2013.01) |
| *G06F 21/62* | (2013.01) |
| *H04L 9/40* | (2022.01) |

(52) U.S. Cl.
CPC ........ *G06F 21/6209* (2013.01); *H04L 9/0861* (2013.01); *H04L 9/0891* (2013.01); *H04L 63/068* (2013.01); *H04N 21/26216* (2013.01); *H04N 21/26613* (2013.01); *H04N 21/8355* (2013.01); *G06F 2221/0753* (2013.01); *G06F 2221/0755* (2013.01); *G06F 2221/2141* (2013.01)

(58) Field of Classification Search
CPC ...... G06F 2221/0755; H04N 21/26216; H04N 21/26613; H04N 21/8355; H04L 9/0861; H04L 9/0891; H04L 63/068
See application file for complete search history.

(56) References Cited

U.S. PATENT DOCUMENTS

| | | | |
|---|---|---|---|
| 10,437,968 B2 | 10/2019 | Hensgen et al. | |
| 2007/0160208 A1 | 7/2007 | MacLean et al. | |
| 2007/0294170 A1 | 12/2007 | Vantalon et al. | |
| 2010/0061549 A1 | 3/2010 | Seo et al. | |
| 2012/0114118 A1 | 5/2012 | Verma | |
| 2012/0246462 A1 | 9/2012 | Moroney et al. | |
| 2013/0031642 A1* | 1/2013 | Dwivedi ............... | G06F 21/105 726/29 |
| 2013/0061299 A1* | 3/2013 | Novak ................. | H04L 63/068 726/6 |
| 2013/0121489 A1 | 5/2013 | Pestoni et al. | |
| 2013/0260796 A1 | 10/2013 | Hasek | |
| 2014/0215214 A1 | 7/2014 | Barnes et al. | |
| 2016/0105283 A1* | 4/2016 | Mityagin ................. | H04L 9/12 380/279 |
| 2018/0150620 A1 | 5/2018 | Hensgen et al. | |
| 2020/0089844 A1 | 3/2020 | Hensgen et al. | |

FOREIGN PATENT DOCUMENTS

| | | |
|---|---|---|
| EP | 3545447 B1 | 9/2020 |
| WO | WO-2018098432 A1 | 5/2018 |

OTHER PUBLICATIONS

U.S. Appl. No. 16/553,926, filed Aug. 28, 2019, Secure DRM-Agnostic Key Rotation.
"U.S. Appl. No. 15/361,904, Examiner Interview Summary dated Mar. 1, 2019", 3 pgs.
"U.S. Appl. No. 15/361,904, Non Final Office Action dated Nov. 20, 2018", 19 pgs.
"U.S. Appl. No. 15/361,904, Notice of Allowance dated May 30, 2019", 9 pgs.
"U.S. Appl. No. 15/361,904, Resonse filed Feb. 19, 2019 to Non Final Office Action dated Nov. 20, 2018", 16 pgs.
"U.S. Appl. No. 16/553,926, Examiner Interview Summary dated Oct. 14, 2020", 3 pgs.
"U.S. Appl. No. 16/553,926, Non Final Office Action dated Jul. 23, 2020", 22 pgs.
"U.S. Appl. No. 16/553,926, Notice of Allowance dated Feb. 5, 2021", 19 pgs.
"U.S. Appl. No. 16/553,926, Preliminary Amendment filed Dec. 20, 2019", 7 pgs.
"U.S. Appl. No. 16/553,926, Response filed Oct. 23, 2020 to Non Final Office Action dated Jul. 23, 2020", 11 pgs.
"European Application Serial No. 17809431.4, Response filed Dec. 23, 2019 to Communication pursuant to Rules 161(2) and 162 EPC dated Jun. 19, 2019", 18 pgs.
"International Application Serial No. PCT/US2017/063279, International Preliminary Report on Patentability dated Jun. 6, 2019", 7 pgs.
"International Application Serial No. PCT/US2017/063279, International Search Report dated Feb. 9, 2018", 4 pgs.
"International Application Serial No. PCT/US2017/063279, Written Opinion dated Feb. 9, 2018", 5 pgs.
"Chinese Application Serial No. 201780073200.1, Office Action dated Oct. 9, 2022", with machine translation, 24 pgs.

\* cited by examiner

US 11,550,882 B2

SECURE DRM-AGNOSTIC KEY ROTATION

CLAIM OF PRIORITY

This application is a continuation of U.S. patent application Ser. No. 16/553,926, filed on Aug. 28, 2019, which is a continuation of U.S. patent application Ser. No. 15/361,904, filed on Nov. 28, 2016, which are incorporated herein by reference in their entireties.

FIELD

The present disclosure generally relates to machines configured to the technical field of special-purpose machines that manage licenses and access to digital content including computerized variants of such special-purpose machines and improvements to such variants, and to the technologies by which such special-purpose machines become improved compared to other special-purpose machines for provisioning of keys in secure digital rights management (DRM) systems.

BACKGROUND

Conventionally, different digital rights management (DRM) systems use different structures to signal availability of a new key (e.g., for live over-the-top (OTT) broadcasts or re-broadcasts). Standards bodies have agreed to allow the DRM system and key (license) identifier to be embedded in the content. One intention of OTT protocols is to use HTTP to allow content to be cached in a network and to efficiently deliver to customers the same content. Typically, the content carries a signal that provides a newer license identifier to the receiver. Thus, all receivers receive the indication that there is about to be a key change at about the same time. This near simultaneous reception, therefore, results in congestion at a license server as each receiver requests the new license from the license server upon receiving the newer license identifier. Furthermore, the content key is typically uniquely encrypted for each of the receivers, which places an even heavier load on the license server.

BRIEF DESCRIPTION OF DRAWINGS

Various ones of the appended drawings merely illustrate example embodiments of the present invention and cannot be considered as limiting its scope.

DETAILED DESCRIPTION

Figure 1:
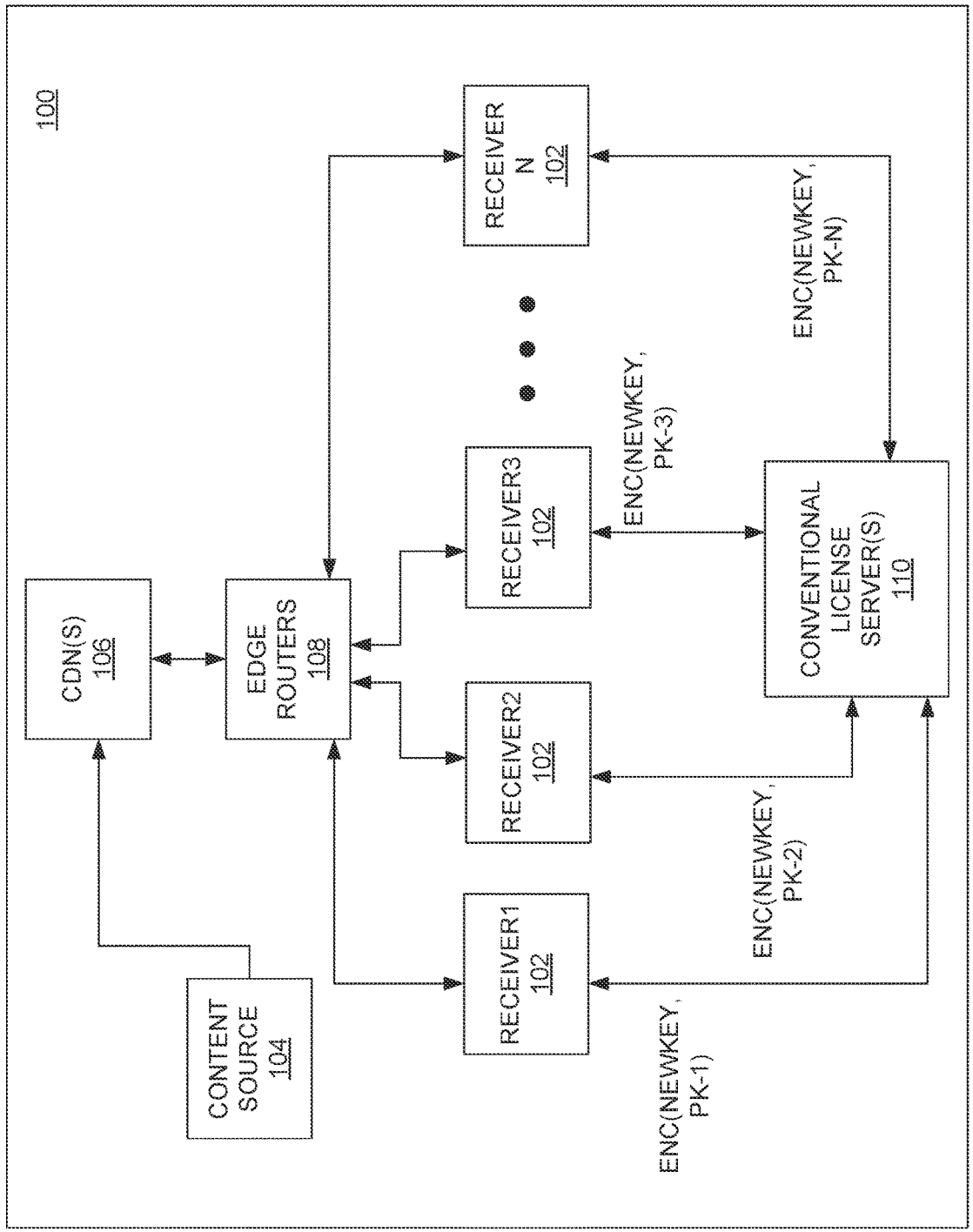
FIG. 1 is a diagram illustrating a current environment for managing licenses for key rotation.

The description that follows includes systems, methods, techniques, instruction sequences, and computing machine program products that embody illustrative embodiments of the present inventive subject matter. In the following description, for purposes of explanation, numerous specific details are set forth in order to provide an understanding of various embodiments of the inventive subject matter. It will be evident, however, to those skilled in the art, that embodiments of the inventive subject matter may be practiced without some or other of these specific details. In general, well-known instruction instances, protocols, structures, and techniques have not been shown in detail. Examples merely typify possible variations. Unless explicitly stated otherwise, structures (e.g., structural components, such as modules) are optional and may be combined or subdivided, and operations (e.g., in a procedure, algorithm, or other function) may vary in sequence or be combined or subdivided.

Example methods (e.g., algorithms) facilitate managing provisioning of keys (via licenses) at random or staggered times prior to a key rotation, and example systems (e.g., special-purpose machines) are configured to provision keys at random or staggered times prior to the key rotation. In particular, example embodiments provide mechanisms and logic that generate licenses that include, or are associated with, a random or staggered renewal time during which a receiver will request a next license. The renewal time is different for different receivers so as to stagger requests to the license server for the next key prior to a key rotation time (e.g., expiration time of a current key). As a result, one or more of the methodologies described herein facilitate solving the technical problem of congestion or bottlenecks that occur at the license server when a plurality of receivers request the next key at roughly the same time.

In a specific example embodiment, mechanisms and logic are provided that manage licenses for DRM-agnostic key rotations and provisioning of next keys prior to a key rotation. A license server generates a license that includes, or is associated with, the renewal time. The renewal time is a time that is prior to a key rotation time, and triggers a receiver device to send a renewal request prior to the key rotation time. The renewal time may be a randomized time prior to the key rotation time that differs for different receiver devices. The license is transmitted to the receiver device. The renewal time may be embedded in the initial license, transmitted with the initial license, or separately transmitted to the receiver device. The license server then receives a renewal request from the receiver device that is triggered at the renewal time. The license server generates a next license that comprise a next key and renewal information (or generates a renewal license having information that allows the renewal of the existing key license and a separate new or next license having the next key), whereby the next key is a decryption key for decrypting the encrypted signal after the key rotation time. The next license is transmitted to the receiver device. In example embodiments, the next license includes, or is associated with, a next renewal time that is a time slightly prior to a next key rotation. The next renewal time may be embedded in the next license, transmitted with the next license, or separately transmitted to the receiver device.

With reference to FIG. 1, a diagram illustrating a current environment 100 comprising a system for providing keys is shown. In current embodiments, users view digital content (e.g., a television program) that is obtained through their respective receivers (also referred to as "receiver devices"), such as receiver1, receiver2, receiver3, through receiver-n (collectively referred to as "receivers 102"). The receivers 102 pull the content from a content source 104 via a content distribution network (CDN) 106 and edge routers 108. In order to protect broadcast (e.g., satellite, terrestrial, cable) content from being illegally accessed, the content may be encrypted. In general, a key is used to encrypt the content, using some algorithm such as AES 256/CTR. For example, the content is encoded, and then encrypted using the key and encryption algorithm. The encrypted content is then sent to the CDN(s) 106. Additionally, the key along with license information is sent to a conventional license server 110. Typically, the content is encrypted with different DRM protocols. Thus for multi-DRMs, key and optional license information is shared with multiple license servers 110.

Due to the use of HTTP and an ability of the edge routers 108 to cache live content, the receivers 102 obtain the content from the edge routers 108. In order to decrypt the content, the receivers 102 communicate with the conventional license server 110 to obtain a license that contains the key or is otherwise associated with the key that is used to encrypt the content. The key may be identified from a keyID included in the signal comprising the encrypted content. Each receiver 102 (or receiver device) may be authorized for a certain set of proprietary DRMs. For example, one receiver 102 may be authorized for Microsoft PlayReady, another authorized for Nagra Connect, and a third authorized for Veramatrix DRM. As such, each receiver 102 obtains the key and license information from the conventional license server 110 for which they are authorized. Accordingly, challenges may be exchanged between the receivers 102 and their respective license server 110 to verify the receiver 102, determine the receiver 102 has authorization for the key, and determine that the receiver 102 has the right credentials in order for the conventional license server 110 to return the key to the receiver 102. For example, the license server 110 validates the receiver's ID, checks that the receiver 102 has a license (e.g., via the challenges), and encrypts, using the receiver's private key, the license.

The receivers 102 each comprises a DRM implementation that knows how to unpackage the license received from their license server 110. That is, the DRM implementation on the receiver 102 knows how to obtain the key from the license and how to place the key into a special key register so the receiver 102 can decrypt the encrypted content in the signal. It is important to have the receivers 102 understand different proprietary DRMs that can play exactly the same kinds of content so that multiple encrypted copies of the content are not required.

Key rotation may be used to protect content, in particular "live" OTT channels. Key rotation is when the key used to encrypt the content is changed over time in order to prevent attacks that can be used when there is substantial clear/encrypted content using the same key. Typically, an upcoming key change is indicated in a signal with the content so that the receiver 102 can prepare to decrypt the content before the content requiring the new key is available. The signal may include a keyID for the new key. As such, the receivers 102 need to request the conventional license server 110 for the new key and store it in their key register prior to the key rotation or switch.

Although caching can be used to alleviate load on the CDN(s) 106 to obtain the content using the edge routers 108, all the receivers 102 communicate with their license servers simultaneously to request the new licenses/keys. This near simultaneous reception, therefore, results in congestion at the conventional license server 110 as each receiver 102 requests the new license from the conventional license server 110. Additionally, the content key is typically uniquely encrypted for each of the receivers 102, which places an even heavier load on the conventional license server 110. That is, an encrypted license containing a new key along with a private key for each receiver (e.g., ENC (NEWKEY, PK-1), ENC(NEWKEY, PK-2) ENC (NEWKEY, PK-3) ENC(NEWKEY, PK-N)) needs to be returned to each respective receiver 102.

A potential solution to this congestion problem is use of a global key to protect the key. For example, when the receiver 102 first logs onto their respective (proprietary) license server 110, in addition to receiving the key to decrypt the content that they are seeing right now, the receiver 102 also receives a global key. So every receiver 102 gets the same global key. The next time the key changes, a generic license server encrypts the new key with the global key and embeds that into the signal (e.g., into the content stream or broadcast stream). However, this requires all proprietary systems to change the implementation of their DRM to rely on generic data that is in the stream (e.g., in order to use the global key to protect the key). Additionally, having a global key that is used forever eventually presents the same problem as not having key rotation. That is, eventually, the global key could be discovered (e.g., hacked). When this happens, one system being compromised means all systems are susceptible.

Figure 2:
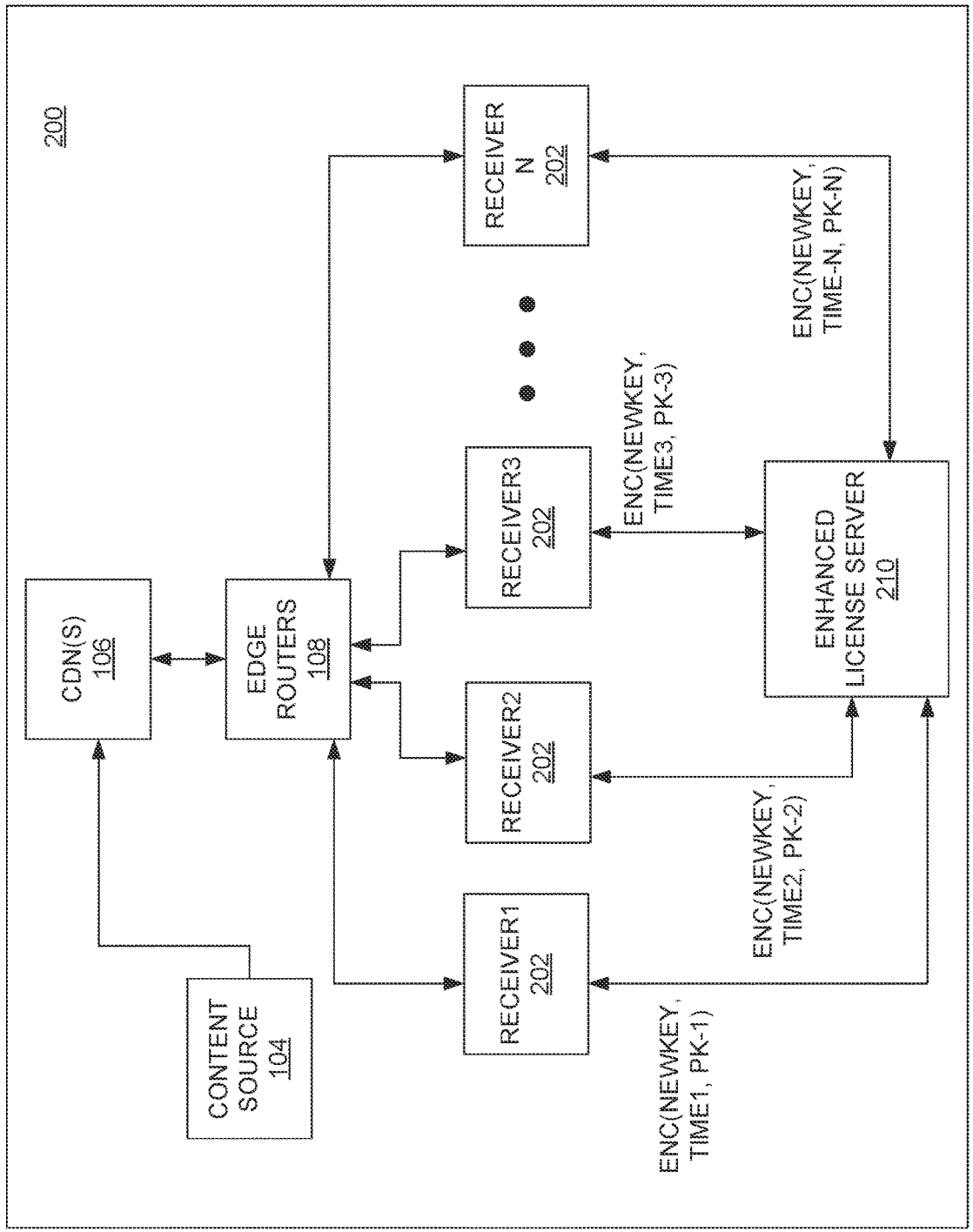
FIG. 2 is a diagram illustrating an example enhanced environment for securely managing licenses for DRM agnostic key rotation.

Referring now to FIG. 2, an example enhanced environment 200 for securely managing keys for DRM agnostic key rotation is shown. In the environment 200, an enhanced license server 210 provides different renewal times to receivers 202, whereby the renewal times are prior to a time of a next key rotation. Accordingly, the receivers 200 are not all requesting the new key at the same time, but instead, the requests are staggered. This eliminates or mitigates the congestion problem at the enhanced licensed server 210.

In example embodiments, when the enhanced license server 210 sends a license to each receiver 202, the license server 210 includes a renewal time that is different for various ones of the receivers 202. The renewal time may be a time that is slightly prior to a key rotation time (e.g., an expiration time of a current key). For example, the renewal time may be a random time between a current time and a time at which the key will expire or a key rotation occurs (collectively referred to as the "key rotation time") minus a little time to ensure the receivers 202 are updated. In another example, the renewal time can be incrementally changed for each receiver 202 (e.g., receiver1 renewal time=key rotation time minus 0.2 seconds; receiver2 renewal time=key rotation time minus 0.4 seconds; receiver3 renewal time=key rotation time minus 0.6 seconds).

As a result, each receiver 202 can use a current key until the renewal time. Once the renewal time is reached at one of the receivers 202, that receiver 202 sends a request to renew the license assuming the user of that receiver 202 is still watching the channel or content. In response to the renewal request, the license server 210, in some embodiments, returns a next license that is encrypted for the particular receiver 202 (e.g., by private keys such as PK-1, PK-2, PK-3) that includes information to renewal an existing key license so the user can continue to watch the content along with a next key (e.g., NEWKEY) and a next renewal time (e.g., TIME1, TIME2, TIME2). The next key is cached by the receiver 202 until it sees an indication in the content stream for that keyID. The next renewal time will indicate a time prior to the next key expiration or key rotation when the receiver 202 needs to renewal the license and obtain a further next key. Alternatively, the next license may comprises the next key, but the information to renewal the existing key license (e.g., the private key) is separately sent in a renewal license.

While example embodiments are discussed whereby the enhanced license server 210 determines the renewal time, alternative embodiments may configure the receivers 202 to determine the renewal time. For example, each receiver 202 may be configured with a randomizer that randomizes the renewal time for that receiver 202 such that at least some of the receivers 202 will request a renewal at different times. In another example, each receiver 202 may be configured to determine a renewal time that is incrementally different from other receivers 202. For example, receiver1 and receiver3 may determine a renewal time that is equal to the key expiration time minus 0.2 seconds; receiver 2 may determine a renewal time that is equal to the key expiration time minus 0.4 seconds; and receiver4 may determine a renewal time that is equal to the key expiration time minus 0.6 seconds.

It is noted that the environment 200 shown in FIG. 1 is merely an example. For instance, not all components of the environment 200 may be shown. Additionally, some components of the environment 200 may be combined. Furthermore, operations discussed as occurring at the enhanced license server 210 may be performed at the receiver 202.

Any of the systems or machines (e.g., databases, devices, servers) shown in FIG. 2 may be, include, or otherwise be implemented in a special-purpose (e.g., specialized or otherwise non-generic) computer that has been modified (e.g., configured or programmed by software, such as one or more software modules of an application, operating system, firmware, middleware, or other program) to perform one or more of the functions described herein for that system or machine. For example, a special-purpose computer system able to implement any one or more of the methodologies described herein is discussed below with respect to FIG. 7, and such a special-purpose computer may accordingly be a means for performing any one or more of the methodologies discussed herein. Within the technical field of such special-purpose computers, a special-purpose computer that has been modified by the structures discussed herein to perform the functions discussed herein is technically improved compared to other special-purpose computers that lack the structures discussed herein or are otherwise unable to perform the functions discussed herein. Accordingly, a special-purpose machine configured according to the systems and methods discussed herein provides an improvement to the technology of similar special-purpose machines.

Figure 3:
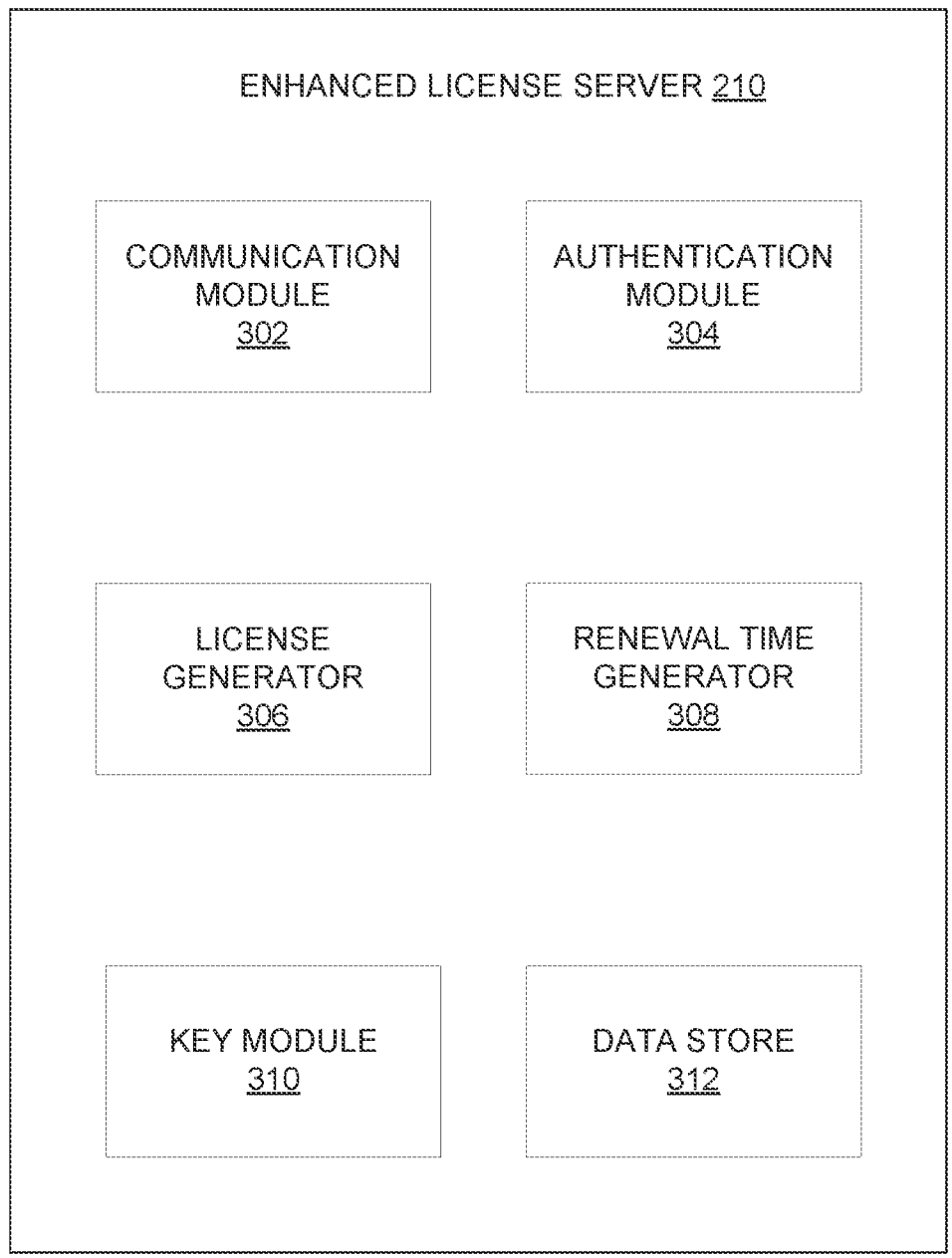
FIG. 3 is a block diagram illustrating an example embodiment of components within an enhanced license server.

FIG. 3 is a block diagram illustrating an example embodiment of components within the enhanced license server 210. The enhanced license server 210 is configured to generate and provide licenses comprising keys for decrypting encrypted content. In accordance with some embodiments, the enhanced license server 210 is configured to determine a renewal time that is different for different sets (e.g., one or more) of receivers 202 such that the different sets of receivers will request a next key at different times. In order to perform these operations, the enhanced license server 210 comprises a communication module 302, an authentication module 304, a license generator 306, a renewal time generator 308, and a key module 310 all communicatively coupled together (e.g., via a bus). The enhanced license server 210 also comprises a data store 312 that stores licenses or license information.

The communication module 302 manages exchange of information with the content servers 102 and the receivers 202. In example embodiments, the communication module 302 receives keys from the content servers 102 that the content server 102 used to encrypt its content. The keys include "next" keys for when a current key reaches an expiration time and a key rotation occurs. The communication module 302 also receives license requests and renewal requests from each receiver 202. In response to these requests, the communication module 302 may send a license, a renewal license and/or a next license. The license may comprise one or more of a private key, a renewal time, or a next key. The various keys may be stored to the data store 312.

The authentication module 304 authenticates each receiver 202 in response to each license request or renewal request. Accordingly, the authentication module 304 may exchange, via the communication module 302, challenges to verify and authenticate the receiver 202. Authentication information used to verify each receiver 202 may be stored in, and retrieved from, the data store 312.

Once authenticated, the license generator 306 generates an initial license, a next license, and in some embodiments, a renewal license for the receiver 202 depending on a request type received from the receiver 202 (e.g., license request, renewal request). The initial license or next license may comprise one or more of a private key, a renewal time, or a next key. Accordingly, the license generator 306 communicates with the renewal time generator 308 to obtain the renewal time and the key module 310 to obtain the private key and next keys. In some embodiments, the license generator encrypts the initial license or next license prior to the communication module 302 transmitting the initial license or the next license to the receiver 202.

The renewal time generator 308 manages the determination of a renewal time. The renewal time is a time prior to a next key rotation time that is different for some of the receivers 202 in order to stagger renewal requests (e.g., requests for the next key). In some embodiments, the renewal time generator 308 randomizes the renewal time for each license so that renewal time is randomly distributed between sometime in the future and the expected time for the new keyID (e.g., signal for upcoming key rotation) to appear in the stream, which indicates the expiration time. In alternative embodiments, the renewal time generator 308 uses different increments of time to randomize the renewal time. The renewal time generator 308 then provides the renewal time to the license generator 306.

The key module 310 manages the keys for the various content and content providers 102. In example embodiments, the key module receives current and next keys from the content providers 102 and stores the keys in the data store 312. When a receiver 202 requests a license for a particular piece of content, the key module 310 may obtain a current key or next key for the piece of content (e.g., from the data store 312) and provides the keys to the license generator 306. The key module 310 may also manage private keys associated with the receivers 202.

Any one or more of the components (e.g., modules, generators) described herein may be implemented using hardware alone (e.g., one or more processors of a machine) or a combination of hardware and software. For example, any component described herein may physically include an arrangement of one or more of the processors or configure a processor (e.g., among one or more processors of a machine) to perform the operations described herein for that module. Accordingly, different components described herein may include and configure different arrangements of the processors at different points in time or a single arrangement of the processors at different points in time. Each component (e.g., module) described herein is an example of a means for performing the operations described herein for that component. Moreover, any two or more of these components may be combined into a single component, and the functions described herein for a single component may be subdivided among multiple components. Furthermore, according to various example embodiments, components described herein as being implemented within a single machine, database, or device may be distributed across multiple machines, databases, or devices. For example, some of the components (e.g., renewal time generator 308) may be embodied within the receiver 202. The enhanced license server 210 may comprise other components not pertinent to example embodiments that are not shown or discussed.

Figure 4:
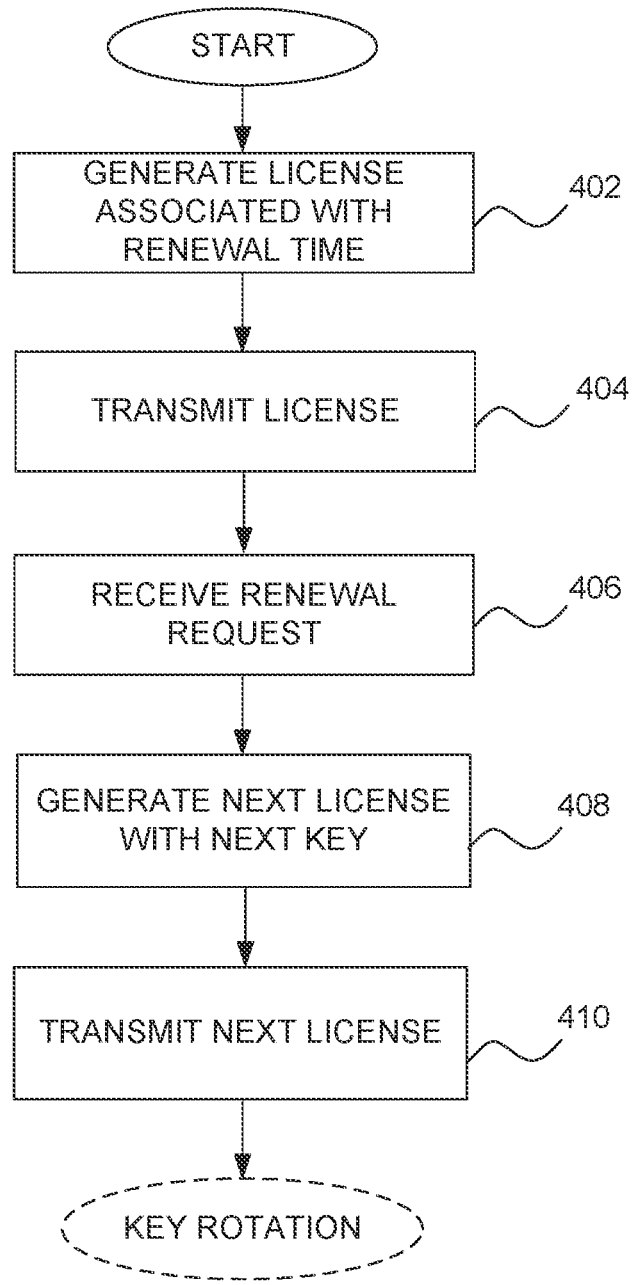
FIG. 4 is a flow diagram of an example method for managing licenses for DRM agnostic key rotation.

FIG. 4 is a flow diagram of an example method 400 for securely managing keys for DRM agnostic key rotation. In example embodiments, the method 400 is performed in part or in whole by components of the enhanced license server 210. Accordingly, the method 400 is described by way of example with reference to the enhanced license server 210. However, it shall be appreciated that at least some of the operations of the method 400 may be deployed on various other hardware configurations or be performed by similar components residing elsewhere in the environment 200 such as at the receiver 202. Therefore, the method 400 is not intended to be limited to the enhanced license server 210.

The method 400 assumes that an initial or first request for a license does not include a next key. Accordingly in operation 402, the license generator 306 generates an initial license. The license generator 306 is triggered to generate the initial license in response to a license request, received by the communication module 302, from the receiver 202 for a license for a piece of content, and in response to the authentication module 304 authenticating the receiver 202. The initial license may include a current key and a renewal time for a next key rotation. Alternatively, the initial license may include the current key and be associated with, but does not include, the renewal time. Operation 402 will be discussed in more detail in connection with FIG. 5 below.

In operation 404, the initial license is transmitted by the communication server 302 to the receiver 202. At the renewal time indicated in the initial license, the receiver 202 sends a license renewal request, which is received by the communication module 302 in operation 406.

In operation 408, the license generator 306 generates a next license. The license generator 306 is triggered to generate the next license once the authentication module 304 authenticates the receiver 202 that is sending the renewal request. In some embodiments, the next license includes the private key, a next renewal time, and a next key (also referred to as a "new key"). In other embodiments, the next license comprises the next key and is associated with, but does not include, the next renewal time. Further still, the next license (having the next key), in additional to a renewal license (having only the private key), may be generated. Operation 408 will be discussed in more detail in connection with FIG. 6 below. Once generated, the next license is transmitted by the communication module 302 to the receiver 202 in operation 410.

Prior to transmission of the initial license, the license can be encrypted. As discussed above, the proprietary (encrypted) license may not contain the renewal time but the renewal time may be separately sent or sent as a package with the proprietary license. In some embodiments, an application running on the receiver 202 passes the proprietary license, which it may not understand (e.g., because the proprietary license is encrypted with keys used by a secure middleware/firmware) to a lower level application or software which can parse the proprietary license. However, there may be a part of the package, which is understood by the application, which contains the renewal time. Subsequently at renewal time, the application, itself, may ask the lower level application or software to generate a proprietary challenge which is forwarded to the license server 210. In some embodiments, the receiver 202 receives two packages from the license server 210. The first package comprises a renewal license for the current key (e.g., the private key) and the second package comprises the new or next license for the next key. In this way, the mechanisms described herein can be used without modifying middleware or firmware, but an application that understands the protocol described herein may run at an application level. As such, example embodiment may be used simply by placing a new JavaScript program on a server.

Figure 5:
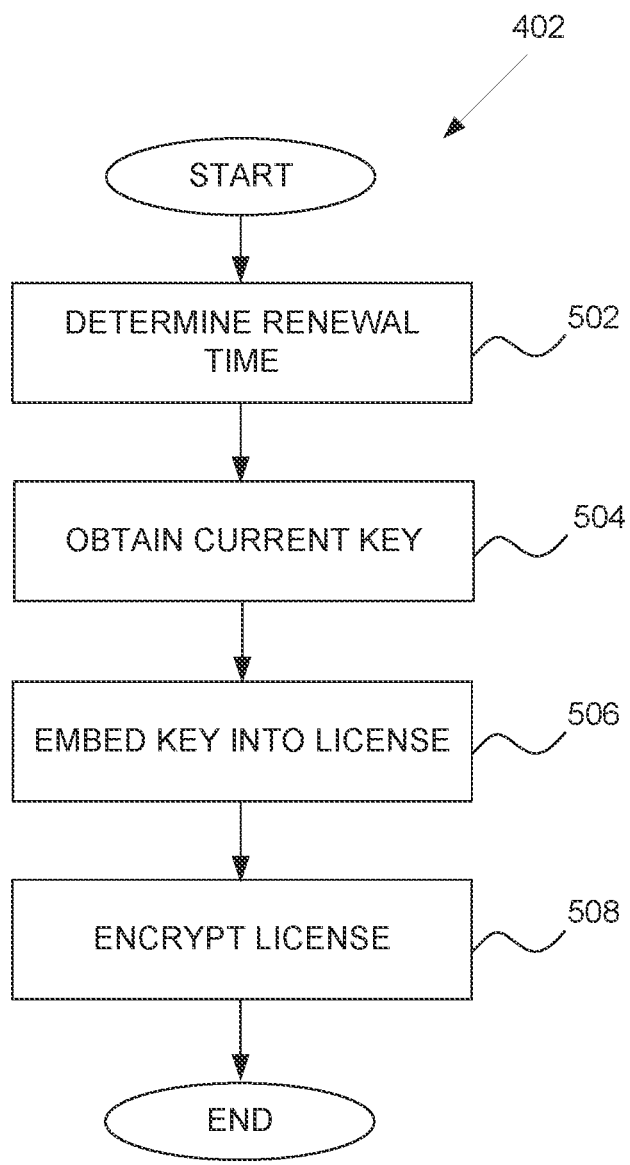
FIG. 5 is a flow diagram of an example method for generating an initial license.

FIG. 5 is a flow diagram of an example method (operation 402) for generating the initial license. In example embodiments, the method is performed in part or in whole by components of the enhanced license server 210. Accordingly, the method is described by way of example with reference to the enhanced license server 210. However, it shall be appreciated that at least some of the operations of the method may be deployed on various other hardware configurations or be performed by similar components residing elsewhere in the environment 200 such as at the receiver 202. Therefore, the method is not intended to be limited to the enhanced license server 210.

In operation 502, a renewal time is determined by the renewal time generator 308. The renewal time is a time prior to a next key expiration/rotation time. The renewal time is randomized or staggered such that the renewal time is different for each receiver 202. As such, the renewal time generator 308 identifies the next key rotation time and uses the next key rotation time as a base for determining the renewal time. In some embodiments, the renewal time generator 308 randomizes the renewal time for each license so that renewal time is randomly distributed between sometime in the future and the expected key expiration time. In alternative embodiments, the renewal time generator 308 uses different increments of time to randomize the renewal time (e.g., key rotation time minus an increment of time such as 0.2 for every third request, key rotation time minus an increment of time such as 0.4 for every fifth request). The renewal time generator 308 then provides the renewal time to the license generator 306. In embodiments where the receiver 202 determines the renewal time, operation 502 is optional or not performed.

In operation 504, the key module 310 obtains a current key for the current piece of content. As such, the key module 310 accesses a data store of keys and retrieves the current key. The key module 310 provides the current key to the license generator 306.

In operation 506, the license generator 306 generates the initial license. In some embodiments, the license generator 306 embeds the current key and renewal time into the license. The license generator 306 may then encrypt the license in operation 508. Alternatively, the license generator 306 embeds the current key into the license and associates the renewal time with the license. That is, the initial license that is generated in operation 506 will not include the renewal time. In these alternative embodiments, the renewal time may be sent with the license or separately transmitted at a different time, but prior to the key rotation time, to the receiver 202.

Figure 6:
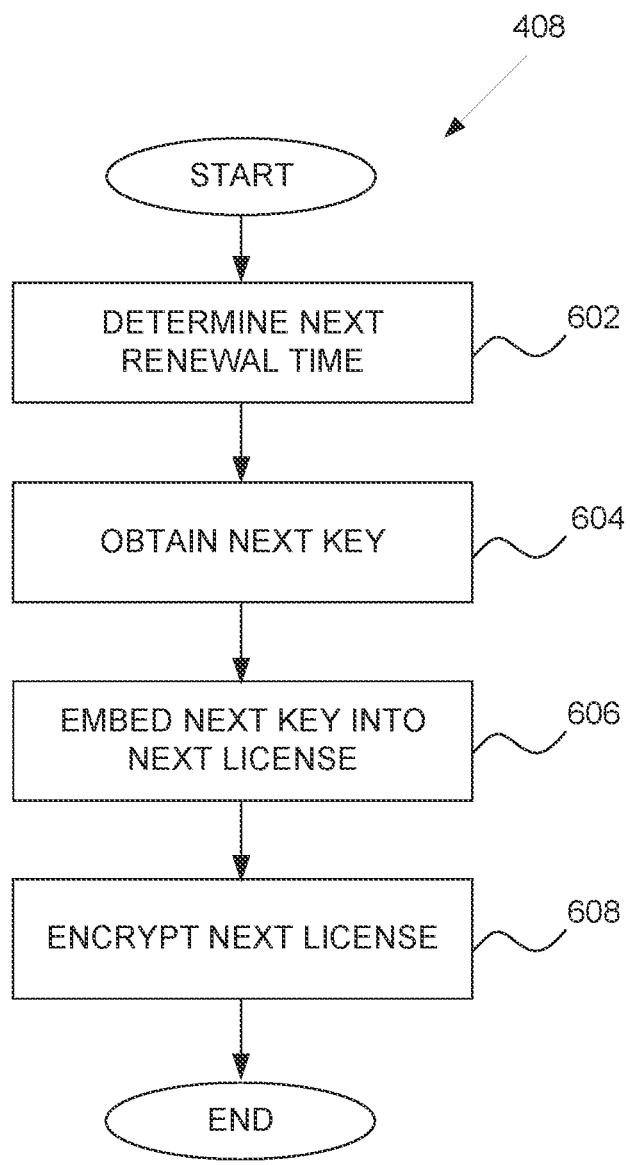
FIG. 6 is a flow diagram of an example method for generating a next license.

FIG. 6 is a flow diagram of an example method (operation 408) for generating the next license. In example embodiments, the method is performed in part or in whole by components of the enhanced license server 210. Accordingly, the method is described by way of example with reference to the enhanced license server 210. However, it shall be appreciated that at least some of the operations of the method may be deployed on various other hardware configurations or be performed by similar components residing elsewhere in the environment 200 such as at the receiver 202. Therefore, the method is not intended to be limited to the enhanced license server 210.

In operation 602, a next renewal time is determined by the renewal time generator 308. The next renewal time is a time prior to a next key expiration/rotation time. As with operation 502, the renewal time is randomized or staggered such that the renewal time is different for each receivers 202. The renewal time generator 308 then provides the renewal time to the license generator 306. In embodiments where the receiver 202 determines the renewal time, operation 602 is optional or not performed.

In operation 604, the key module 310 obtains a next key for the current piece of content. As such, the key module 310 accesses a data store of keys and retrieves the next key. The key module 310 provides the next key to the license generator 306.

In operation 606, the license generator 306 generates the next license. In some embodiments, the license generator 306 embeds the next key and next renewal time into the next license. The license generator 306 may then encrypt the license in operation 610. Alternatively, the license generator 306 embeds the next key into the next license and associates the next renewal time with the next license. That is, the next license that is generated in operation 606 will not include the renewal time. In these alternative embodiments, the next renewal time may be sent with the next license or separately transmitted at a different time, but prior to the next key rotation time, to the receiver 202. In these embodiments, the next license does not include information to renewal the current license (e.g., the private key). Instead, the renewal information is included in a separate renewal license. In other embodiments, the license generator 306 generates the next license having the next key and the renewal information (e.g., private key).

Figure 7:
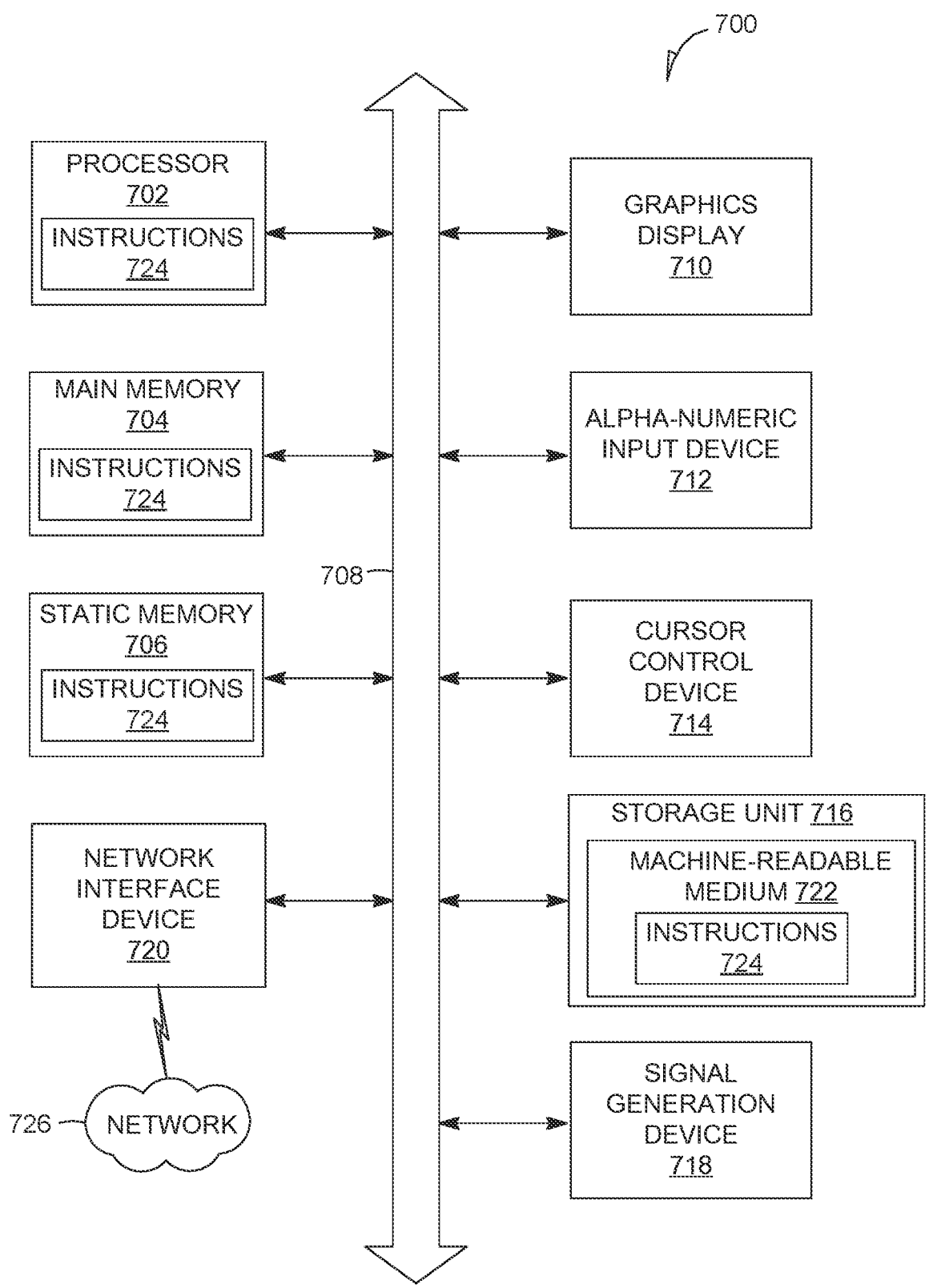
FIG. 7 is a diagrammatic representation of a machine in an example form of a computing system within which a set of instructions may be executed for causing the machine to perform any one or more of the methodologies discussed herein, according to an example embodiment.

FIG. 7 is a block diagram illustrating components of a machine 700, according to some example embodiments, able to read instructions 724 from a machine-readable medium 722 (e.g., a non-transitory machine-readable medium, a machine-readable storage medium, a computer-readable storage medium, or any suitable combination thereof) and perform any one or more of the methodologies discussed herein, in whole or in part. Specifically, FIG. 7 shows the machine 700 in the example form of a computer device (e.g., a computer) within which the instructions 724 (e.g., software, a program, an application, an applet, an app, or other executable code) for causing the machine 700 to perform any one or more of the methodologies discussed herein may be executed, in whole or in part.

For example, the instructions 724 may cause the machine 700 to execute the flow diagrams of FIGS. 4 and 5. The instructions 724 can transform the general, non-programmed machine 700 into a particular machine (e.g., specially configured machine) programmed to carry out the described and illustrated functions in the manner described.

In alternative embodiments, the machine 700 operates as a standalone device or may be connected (e.g., networked) to other machines. The machine 700 may be a server computer, a client computer, a personal computer (PC), a tablet computer, a laptop computer, a netbook, a set-top box (e.g. STB), a personal digital assistant (PDA), a cellular telephone, a smartphone, a web appliance, a network router, a network switch, a network bridge, a power adapter, or any machine 700 capable of executing the instructions 724, sequentially or otherwise, that specify actions to be taken by that machine 700. Further, while only a single machine 700 is illustrated, the term "machine" shall also be taken to include a collection of machines that individually or jointly execute the instructions 724 to perform any one or more of the methodologies discussed herein.

The machine 700 includes a processor 702 (e.g., a central processing unit (CPU), a graphics processing unit (GPU), a digital signal processor (DSP), an application specific integrated circuit (ASIC), a radio-frequency integrated circuit (RFIC), or any suitable combination thereof), a main memory 704, and a static memory 706, which are configured to communicate with each other via a bus 708. The processor 702 may contain microcircuits that are configurable, temporarily or permanently, by some or all of the instructions 724 such that the processor 702 is configurable to perform any one or more of the methodologies described herein, in whole or in part. For example, a set of one or more microcircuits of the processor 702 may be configurable to execute one or more modules (e.g., software modules) described herein.

The machine 700 may further include a graphics display 710 (e.g., a plasma display panel (PDP), a light emitting diode (LED) display, a liquid crystal display (LCD), a projector, a cathode ray tube (CRT), or any other display capable of displaying graphics or video). The machine 700 may also include an alphanumeric input device 712 (e.g., a keyboard or keypad), a cursor control device 714 (e.g., a mouse, a touchpad, a trackball, a joystick, a motion sensor, an eye tracking device, or other pointing instrument), a storage unit 716, a signal generation device 718 (e.g., a sound card, an amplifier, a speaker, a headphone jack, or any suitable combination thereof), and a network interface device 720.

The storage unit 716 includes the machine-readable medium 722 (e.g., a tangible machine-readable storage medium) on which are stored the instructions 724 embodying any one or more of the methodologies or functions described herein. The instructions 724 may also reside, completely or at least partially, within the main memory 704, within the processor 702 (e.g., within the processor's cache memory), or both, before or during execution thereof by the machine 700. Accordingly, the main memory 704 and the processor 702 may be considered machine-readable media 722 (e.g., tangible and non-transitory machine-readable media).

In some example embodiments, the machine 700 may be a portable computing device and have one or more additional input components (e.g., sensors or gauges). Examples of such input components include an image input component (e.g., one or more cameras), an audio input component (e.g., a microphone), a direction input component (e.g., a compass), a location input component (e.g., a global positioning system (GPS) receiver), an orientation component (e.g., a gyroscope), a motion detection component (e.g., one or more accelerometers), an altitude detection component (e.g., an altimeter), and a gas detection component (e.g., a gas sensor). Inputs harvested by any one or more of these input components may be accessible and available for use by any of the modules described herein.

As used herein, the term "memory" refers to a machine-readable medium 722 able to store data temporarily or permanently and may be taken to include, but not be limited to, random-access memory (RAM), read-only memory (ROM), buffer memory, flash memory, and cache memory.

While the machine-readable medium 722 is shown, in an example embodiment, to be a single medium, the term "machine-readable medium" should be taken to include a single medium or multiple media (e.g., a centralized or distributed database, or associated caches and servers) able to store instructions 724. The term "machine-readable medium" shall also be taken to include any medium, or combination of multiple media, that is capable of storing instructions 724 for execution by a machine (e.g., machine 700), such that the instructions 724, when executed by one or more processors of the machine 700 (e.g., processor 702), cause the machine 700 to perform any one or more of the methodologies described herein. Accordingly, a "machine-readable medium" refers to a single storage apparatus or device, as well as cloud-based storage systems or storage networks that include multiple storage apparatus or devices. The term "machine-readable medium" shall accordingly be taken to include, but not be limited to, one or more data repositories in the form of a solid-state memory, an optical medium, a magnetic medium, or any suitable combination thereof. In some embodiments, a "machine-readable medium" may also be referred to as a "machine-readable storage device" or a "hardware storage device."

Furthermore, the machine-readable medium 722 is non-transitory in that it does not embody a propagating or transitory signal. However, labeling the machine-readable medium 722 as "non-transitory" should not be construed to mean that the medium is incapable of movement—the medium should be considered as being transportable from one physical location to another. Additionally, since the machine-readable medium 722 is tangible, the medium may be considered to be a machine-readable storage device.

Furthermore, the machine-readable medium 722 does not comprise any transitory signals. In some example embodiments, the instructions 724 for execution by the machine 700 may be communicated by a carrier medium. Examples of such a carrier medium include a storage medium (e.g., a non-transitory machine-readable storage medium, such as a solid-state memory, being physically moved from one place to another place) and a transient medium (e.g., a propagating signal that communicates the instructions 724)

The instructions 724 may further be transmitted or received over a communications network 726 using a transmission medium via the network interface device 720 and utilizing any one of a number of well-known transfer protocols (e.g., HTTP). Examples of communication networks 726 include a local area network (LAN), a wide area network (WAN), the Internet, mobile telephone networks, plain old telephone service (POTS) networks, and wireless data networks (e.g., WiFi, LTE, and WiMAX networks). The term "transmission medium" shall be taken to include any intangible medium that is capable of storing, encoding, or carrying instructions 724 for execution by the machine 700, and includes digital or analog communications signals or other intangible medium to facilitate communication of such software.

Example 1 is a method for managing key provisioning prior to a key rotation time. The method comprises generating, by a license server, an initial license for a piece of content, the initial license comprising a current key that is used to decrypt an encrypted signal comprising the piece of content, the initial license being associated with a renewal time that represents a time prior to a key rotation time, the renewal time triggering a receiver device to send a renewal request prior to the key rotation time; transmitting, by the license server and via a network, the initial license to the receiver device; receiving, by the license server from the receiver device and via the network, a renewal request, the renewal request being received prior to the key rotation time and requesting renewal of the initial license for the piece of content; in response to receiving the renewal request, generating, by one or more processors of the license server, a next license for the piece of content, the next license comprising a next key, the next key being a decryption key for decrypting the encrypted signal after the key rotation time; and transmitting, by the license server, the next license with the next key to the receiver device prior to the key rotation time.

In example 2, the subject matter of example 1 can optionally include determining, by the license server, the renewal time, the determining the renewal time comprising randomizing the renewal time such that a plurality of receiver devices that includes the receiver device receives different renewal times.

In example 3, the subject matter of examples 1-2 can optionally include determining, by the license server, the renewal time, the determining the renewal time comprising applying an incremental change to the key rotation time to obtain the renewal time, different incremental changes being applied for each of a plurality of receiver devices that includes the receiver device.

In example 4, the subject matter of examples 1-3 can optionally include determining a next renewal time, the next renewal time comprising a time that is prior to a next key rotation time, wherein the generating the next license comprises associating the next renewal time with the next license.

In example 5, the subject matter of examples 1-4 can optionally include wherein the determining the next renewal time comprises randomizing, by the license server, the next renewal time such that a plurality of receiver devices that includes the receiver device receives different next renewal times.

In example 6, the subject matter of examples 1-5 can optionally include wherein the determining the next renewal time comprises applying, by the license server, an incremental change to the next key rotation time to obtain the next renewal time, different incremental changes being applied for each of a plurality of receiver devices that includes the receiver device.

In example 7, the subject matter of examples 1-6 can optionally include wherein the generating the next license comprises embedding the next renewal time into the next license.

In example 8, the subject matter of examples 1-7 can optionally include wherein the generating the initial license comprises embedding the renewal time in the initial license.

In example 9, the subject matter of examples 1-8 can optionally include wherein the generating the next license comprises retrieving the next key from a data store of the license server.

In example 10, the subject matter of examples 1-9 can optionally include transmitting the renewal time to the receiver device prior to the key rotation time.

In example 11, the subject matter of examples 1-10 can optionally include wherein generating the next license for the piece of content comprises incorporating renewal information including the current key in the next license.

In example 12, the subject matter of examples 1-11 can optionally include generating and transmitting a renewal license in response to receiving the renewal request, the renewal license comprising renewal information including the current key.

Example 13 is a hardware storage device storing instructions which, when executed by the at least one processor of a machine, cause the machine to perform operations. The operations comprise generating an initial license for a piece of content, the initial license comprising a current key that is used to decrypt an encrypted signal comprising the piece of content, the initial license being associated with a renewal time that represents a time prior to a key rotation time, the renewal time triggering a receiver device to send a renewal request prior to the key rotation time; transmitting the initial license to a receiver device; receiving, from the receiver device and via the network, a renewal request, the renewal request being received prior to the key rotation time and requesting renewal of the initial license for the piece of content; in response to receiving the renewal request, generating a next license for the piece of content, the next license comprising a next key, the next key being a decryption key for decrypting the encrypted signal after the key rotation time; and transmitting the next license with the next key to the receiver device prior to the key rotation time.

In example 14, the subject matter of example 13 can optionally include determining the renewal time, the determining the renewal time comprising randomizing the renewal time such that a plurality of receiver devices that includes the receiver device receives different renewal times.

In example 15, the subject matter of examples 13-14 can optionally include determining the renewal time, the determining the renewal time comprising applying an incremental change to the key rotation time to obtain the renewal time, different incremental changes being applied for each of a plurality of receiver devices that includes the receiver device.

In example 16, the subject matter of examples 13-15 can optionally include determining a next renewal time, the next renewal time comprising a time that is prior to a next key rotation time, wherein the generating the next license comprises associating the next renewal time with the next license.

In example 17, the subject matter of examples 13-16 can optionally include wherein the generating the initial license comprises embedding the renewal time in the initial license.

In example 18, the subject matter of examples 13-17 can optionally include transmitting the renewal time to the receiver device prior to the key rotation time.

Example 19 is a system for managing key provisioning prior to a key rotation time. The system includes one or more processors configured to perform operations comprising generating an initial license for a piece of content, the initial license comprising a current key that is used to decrypt an encrypted signal comprising the piece of content, the initial license being associated with a renewal time that represents a time that is prior to a key rotation time, the renewal time triggering a receiver device to send a renewal request prior to the key rotation time; transmitting, over a network, the initial license to the receiver device; receiving, from the receiver device and via the network, a renewal request, the renewal request being received prior to the key rotation time and requesting renewal of the initial license for the piece of content; in response to receiving the renewal request, generating a next license for the piece of content, the next license comprising a next key, the next key being a decryption key for decrypting the encrypted signal after the key rotation time; and transmitting the next license with the next key to the receiver device prior to the key rotation time.

In example 20, the subject matter of example 19 can optionally include determining the renewal time, the determining the renewal time comprising randomizing the renewal time such that a plurality of receiver devices that includes the receiver device receives different renewal times.

In example 21, the subject matter of examples 19-20 can optionally include determining the renewal time, the determining the renewal time comprising applying an incremental change to the key rotation time to obtain the renewal time, different incremental changes being applied for each of a plurality of receiver devices that includes the receiver device.

In example 22, the subject matter of examples 19-21 can optionally include determining a next renewal time, the next renewal time comprising a time that is prior to a next key rotation time, wherein the generating the next license comprises associating the next renewal time with the next license.

In example 23, the subject matter of examples 19-22 can optionally include wherein the generating the initial license comprise embedding the renewal time in the initial license.

In example 24, the subject matter of examples 19-23 can optionally include transmitting the renewal time to the receiver device prior to the key rotation time.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms. Modules may constitute either software modules (e.g., code embodied on a machine-readable medium 722 or in a transmission signal) or hardware modules. A "hardware module" is a tangible unit capable of performing certain operations and may be configured or arranged in a certain physical manner. In various example embodiments, one or more computer systems (e.g., a standalone computer system, a client computer system, or a server computer system) or one or more hardware modules of a computer system (e.g., a processor 702 or a group of processors 702) may be configured by software (e.g., an application or application portion) as a hardware module that operates to perform certain operations as described herein.

In some embodiments, a hardware module may be implemented mechanically, electronically, or any suitable combination thereof. For example, a hardware module may include dedicated circuitry or logic that is permanently configured to perform certain operations. For example, a hardware module may be a special-purpose processor, such as a field-programmable gate array (FPGA) or an ASIC. A hardware module may also include programmable logic or circuitry that is temporarily configured by software to perform certain operations. For example, a hardware module may include software encompassed within a general-purpose processor or other programmable processor. It will be appreciated that the decision to implement a hardware module mechanically, in dedicated and permanently configured circuitry, or in temporarily configured circuitry (e.g., configured by software) may be driven by cost and time considerations.

Accordingly, the phrase "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where a hardware module comprises a general-purpose processor configured by software to become a special-purpose processor, the general-purpose processor may be configured as respectively different special-purpose processors (e.g., comprising different hardware modules) at different times. Software may accordingly configure a processor, for example, to constitute a particular hardware module at one instance of time and to constitute a different hardware module at a different instance of time.

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions described herein. As used herein, "processor-implemented module" refers to a hardware module implemented using one or more processors.

Similarly, the methods described herein may be at least partially processor-implemented, a processor being an example of hardware. For example, at least some of the operations of a method may be performed by one or more processors or processor-implemented modules.

Some portions of the subject matter discussed herein may be presented in terms of algorithms or symbolic representations of operations on data stored as bits or binary digital signals within a machine memory (e.g., a computer memory). Such algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or any suitable combination thereof), registers, or other machine components that receive, store, transmit, or display information. Furthermore, unless specifically stated otherwise, the terms "a" or "an" are herein used, as is common in patent documents, to include one or more than one instance. Finally, as used herein, the conjunction "or" refers to a non-exclusive "or," unless specifically stated otherwise.

Although an overview of the inventive subject matter has been described with reference to specific example embodiments, various modifications and changes may be made to these embodiments without departing from the broader scope of embodiments of the present invention. For example, various embodiments or features thereof may be mixed and matched or made optional by a person of ordinary skill in the art. Such embodiments of the inventive subject matter may be referred to herein, individually or collectively, by the term "invention" merely for convenience and without intending to voluntarily limit the scope of this application to any single invention or inventive concept if more than one is, in fact, disclosed.

The embodiments illustrated herein are believed to be described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present invention. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present invention as represented by the appended claims. The specification and drawings are, accordingly, to be regarded in an illustrative rather than a restrictive sense.

What is claimed is:

1. A method comprising:
    transmitting, by a user device to a license server, a request to obtain a license to a piece of content;
    in response to the request to obtain the license, receiving an initial license to the piece of content, the initial license comprising a current key and being associated with a renewal time that is a time prior to a key rotation time that differs for each of a plurality of different user devices accessing the piece of content, the renewal time comprising a time between a current time and a time when the current key expires during which a request to renew access to the piece of content is triggered, the current key is used to decrypt the piece of content as encrypted, the renewal time comprises a randomized time between the current time and the key rotation time or an incremental change subtracted from the key rotation time;
    detecting, by the user device, that the renewal time is reached;

in response to the detecting, triggering transmittal, by the user device to the license server, of a request to renew access to the piece of content;

in response to the request to renew access, receiving a next license to the piece of content prior to the key rotation time, the next license comprising a next key and a next renewal time prior to a next key rotation time that differs for each of the plurality of different user devices; and caching the next key from the next license for later use at the key rotation time, the next key being a decryption key for decrypting the piece of content as encrypted after the key rotation time.

2. The method of claim 1, further comprising determining, by the user device, the renewal time by using a randomizer to randomize the renewal time.

3. The method of claim 1, further comprising determining, by the user device, the renewal time by subtracting a configured increment from the key rotation time.

4. The method of claim 1, further comprising exchanging challenges between the user device and the license server to verify that the user device is authorized to receive the initial license and the next license.

5. The method of claim 1, further comprising identifying the renewal time from the initial license.

6. The method of claim 1, wherein:
a different incremental change is applied to each of the plurality of different user devices including the user device.

7. A system comprising:
one or more hardware processors; and
a storage device storing instructions that configure the one or more hardware processors to perform operations comprising:

transmitting, by a user device to a license server, a request to obtain a license to a piece of content;

in response to the request to obtain the license, receiving an initial license to the piece of content, the initial license comprising a current key and being associated with a renewal time that is a time prior to a key rotation time that differs for each of a plurality of different user devices accessing the piece of content, the renewal time comprising a time between a current time and a time when the current key expires during which a request to renew access to the piece of content is triggered, the current key is used to decrypt the piece of content as encrypted, the renewal time comprises a randomized time between the current time and the key rotation time or an incremental change subtracted from the key rotation time;

detecting, by the user device, that the renewal time is reached;

in response to the detecting, triggering transmittal, by the user device to the license server, of a request to renew access to the piece of content;

in response to the request to renew access, receiving a next license to the piece of content prior to the key rotation time, the next license comprising a next key and a next renewal time prior to a next key rotation time that differs for each of the plurality of different user devices; and caching the next key from the next license for later use at the key rotation time, the next key being a decryption key for decrypting the piece of content as encrypted after the key rotation time.

8. The system of claim 7, wherein the operations further comprise determining, by the user device, the renewal time by using a randomizer to randomize the renewal time.

9. The system of claim 7, wherein the operations further comprise determining, by the user device, the renewal time by subtracting a configured increment from the key rotation time.

10. The system of claim 7, wherein the operations further comprise exchanging challenges between the user device and the license server to verify that the user device is authorized to receive the initial license and the next license.

11. The system of claim 7, wherein the operations further comprise identifying the renewal time from the initial license.

12. The system of claim 7, wherein:
a different incremental change is applied to each of the plurality of different user devices including the user device.

13. A non-transitory machine-readable medium storing instructions that, when executed by one or more hardware processors of a machine, cause the machine to perform operations comprising:

transmitting, by a user device to a license server, a request to obtain a license to a piece of content;

in response to the request to obtain the license, receiving an initial license to the piece of content, the initial license comprising a current key and being associated with a renewal time that is a time prior to a key rotation time that differs for each of a plurality of different user devices accessing the piece of content, the renewal time comprising a time between a current time and a time when the current key expires during which a request to renew access to the piece of content is triggered, the current key is used to decrypt the piece of content as encrypted, the renewal time comprises a randomized time between the current time and the key rotation time or an incremental change subtracted from the key rotation time;

detecting, by the user device, that the renewal time is reached;

in response to the detecting, triggering transmittal, by the user device to the license server, of a request to renew access to the piece of content;

in response to the request to renew access, receiving a next license to the piece of content prior to the key rotation time, the next license comprising a next key and a next renewal time prior to a next key rotation time that differs for each of the plurality of different user devices; and caching the next key from the next license for later use at the key rotation time, the next key being a decryption key for decrypting the piece of content as encrypted after the key rotation time.

14. The machine-readable medium of claim 13, wherein the operations further comprise determining, by the user device, the renewal time by using a randomizer to randomize the renewal time.

15. The machine-readable medium of claim 13, wherein the operations further comprise determining, by the user device, the renewal time by subtracting a configured increment from the key rotation time.

16. The machine-readable medium of claim 13, wherein the operations further comprise exchanging challenges between the user device and the license server to verify that the user device is authorized to receive the initial license and the next license.

17. The machine-readable medium of claim 13, wherein:
a different incremental change is applied to each of the plurality of different user devices including the user device.

* * * * *